United States Patent [19]

Klochko

[11] Patent Number: 4,457,645
[45] Date of Patent: Jul. 3, 1984

[54] APPARATUS FOR BREAKING PAVEMENT

[75] Inventor: Stephen Klochko, Grosse Isle, Mich.

[73] Assignee: Wolverine Technology, Inc., Southfield, Mich.

[21] Appl. No.: 487,332

[22] Filed: Apr. 21, 1983

[51] Int. Cl.³ .............................................. E01C 23/12
[52] U.S. Cl. ..................................... 404/90; 404/133; 172/40
[58] Field of Search ................... 404/90, 133; 172/40; 173/100, 43; 299/29, 36

[56] References Cited

U.S. PATENT DOCUMENTS

| | | | |
|---|---|---|---|
| 2,029,363 | 2/1936 | Downie | 173/100 |
| 2,901,232 | 8/1959 | Lewis | 404/90 X |
| 3,133,730 | 5/1964 | Cornett | 404/90 X |
| 3,150,724 | 9/1964 | Oelkers | 173/100 X |
| 3,181,627 | 5/1965 | Cornett | 173/100 |
| 3,308,730 | 3/1967 | Vorwald | 404/133 |
| 3,805,897 | 4/1974 | Cobb | 173/100 |

Primary Examiner—Nile C. Byers, Jr.
Attorney, Agent, or Firm—Cullen, Sloman, Cantor, Grauer, Scott & Rutherford

[57] ABSTRACT

A pavement breaking apparatus having variable impact force for fracturing concrete to a size and pattern specification without distorting the material. The apparatus includes at least one spring pack connected between a leaf spring housing and an impact tool holder. The housing is connected to a vehicle for pivotal movement about a transverse horizontal axis. Further, the housing is connected to the vehicle for movement about a vertical axis thereby permitting lateral swinging movement of the spring pack and tool holder. The spring pack includes a plurality of stacked leaf springs with a centrally located main leaf spring extending full length between the housing and tool holder. First and second groups of leaf springs having variable lengths are stacked together on opposite sides of the main spring. The spring pack further includes third and fourth groups of leaf springs positioned on opposite sides of the main spring between the main spring and the first and second groups of springs. Finally, fifth and sixth groups of springs are mounted on opposite sides of the main spring between the main spring and the first and second groups of springs with the ends of the third and fourth groups of springs being spaced from the ends of the fifth and sixth groups of springs to form open areas within the spring pack. Each of the leaf springs of the various groups and the main leaf spring have projections which are nestable with one another to provide a locking feature between the individual leaf springs. Further, the leaf spring pack is held in alignment along its length by bracket assemblies, including opposed spacer plates and buffer pads. Thus, the present construction permits flexing of the various leaf spring groups in an improved manner which provides additional flexibility and assists in the fracturing of the concrete without distorting the surface.

7 Claims, 12 Drawing Figures

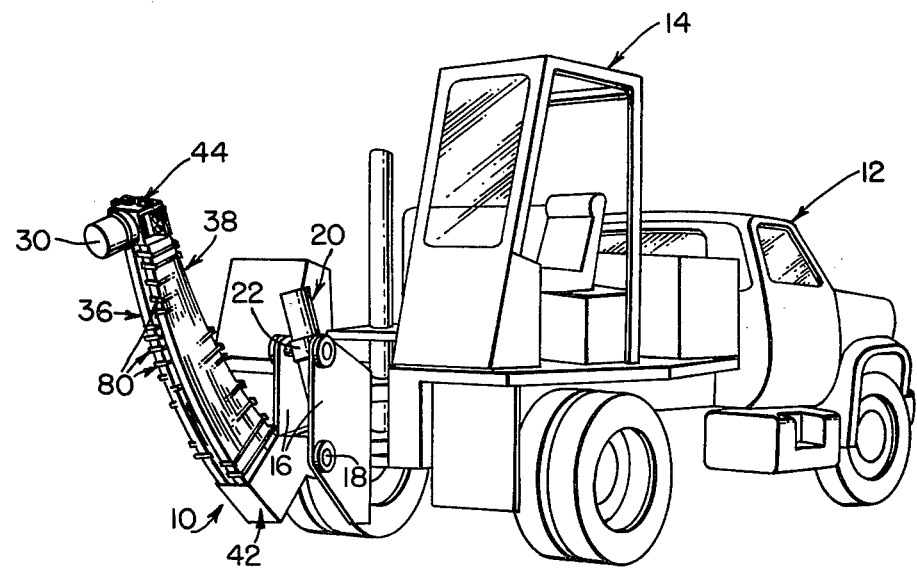
FIG. I
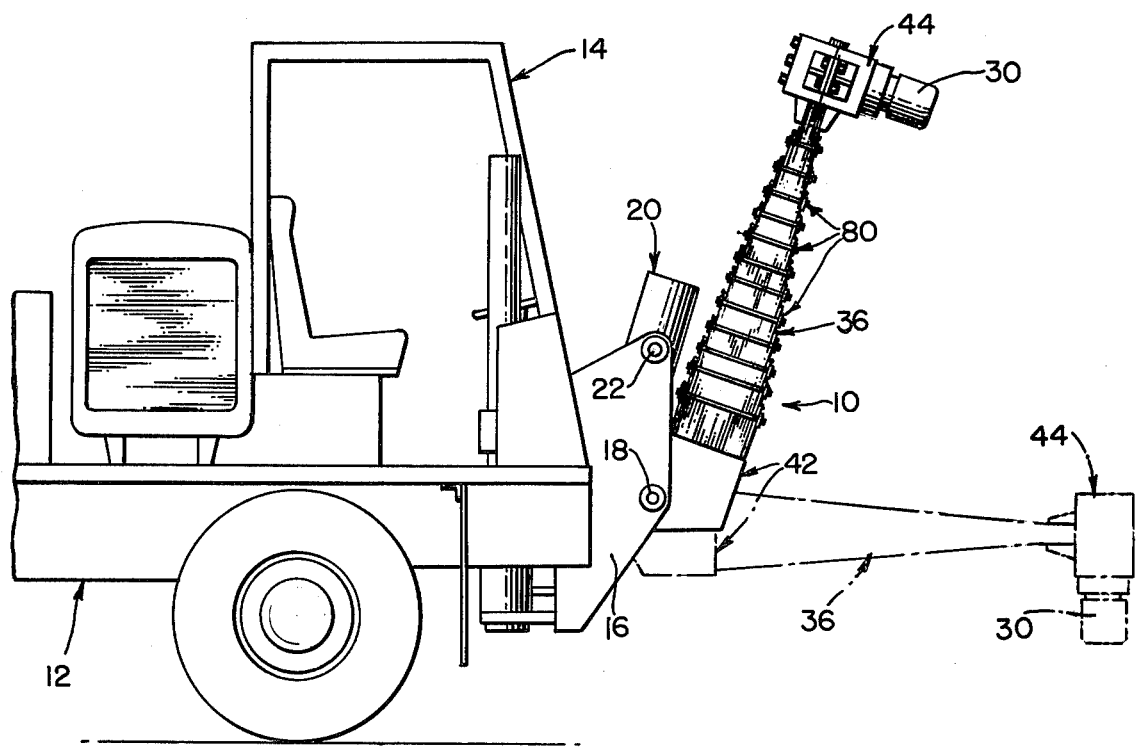
FIG. 2

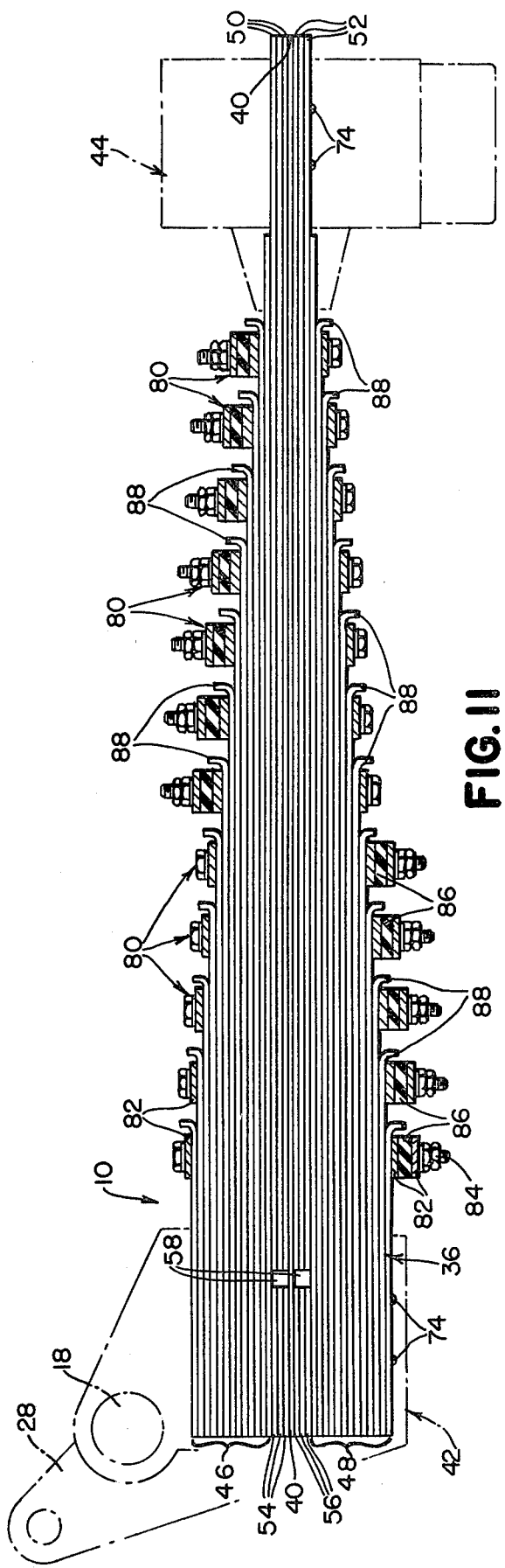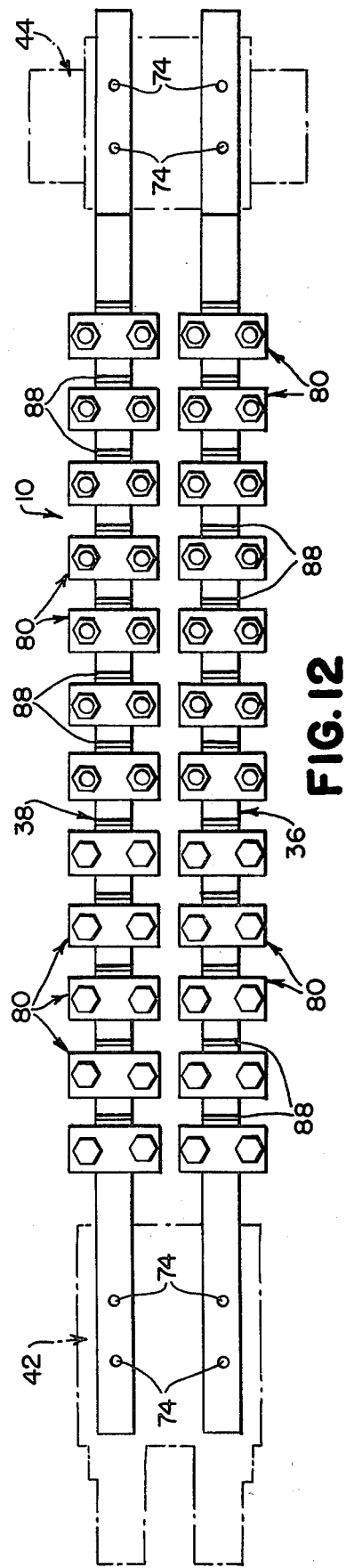

APPARATUS FOR BREAKING PAVEMENT

BACKGROUND OF THE INVENTION

The present invention relates to an apparatus for breaking pavement, and more specifically, to an elongated leaf spring pack having an impact tool on one end with a whipping action being imparted to the tool.

Highway programs are changing from new construction to rehabilitation of existing streets and highways. A common rehabilitation technique for concrete pavements is to overlay the concrete with a hot mix asphalt. However, a serious problem which develops in most overlays is reflective cracking.

Reflection cracking is the propagation of existing cracks and joints in the concrete pavement upwards through the resurfacing layer. The cracking of the overlay is primarily caused by stresses that develop at the bottom of the new overlay directly over the existing cracks and joints in the concrete. The new overlay is usually bonded to the concrete pavement and as the concrete pavement expands and contracts with changing temperatures, stresses develop in the new overlay due to joint movement and reflective cracking develops.

Certain techniques have been developed to reduce reflection cracking including the addition of welded wire mesh and fiber fabric reinforcing to the asphalt overlay, use of lower viscosity asphalt cements, and use of asphalt rubber cements. Another technique which has received considerable attention is to control the reflection cracking by breaking the existing concrete pavement into small segments before overlaying with the asphalt. This construction procedure includes cracking the concrete slabs into pieces small enough to significantly reduce joint movement, rolling the pieces with a roller to seat the pieces firmly on the base or subgrade, and then overlaying with asphalt.

Cracking and seating concrete pavements before overlaying with the hot mix asphalt has many advantages over other methods for controlling reflection cracking. However, the available construction equipment for cracking concrete pavement to specification is limited (e.g., U.S. Pat. Nos. 3,133,730 and 3,181,627 to Cornett). It is important to control the size of the cracked or fractured concrete pavement pieces and to crack the concrete by fracturing it without distorting the surface. This is desirable to retain as much of the aggregate interlock or bridge strength of the concrete as possible.

Thus, it is a principal object of the present invention to provide an apparatus for breaking pavement which has the ability to vary the impact force as required for fracturing the concrete. Further, the present invention permits sizing of the cracked pattern to specification without distorting the concrete, thereby retaining as much aggregate interlock or bridge strength from the concrete as possible.

SUMMARY OF THE INVENTION

The pavement breaking apparatus of the present invention permits cracking or fracturing of concrete without distorting the surface thereby retaining as much aggregate interlock or bridge strength of the concrete as possible. The apparatus has as its principal application the fracturing of concrete for reducing reflective joint cracking through an asphalt overlay. The apparatus has the ability to vary the impact force for fracturing the concrete to a size and pattern as specified without distorting the material and has the ability to be selective in the areas impacted to minimize damage on existing concrete joints. The present apparatus also has applications in other areas such as seismic work where it is desirable to utilize high energy blows to the ground for use in oil exploration.

The pavement breaking apparatus of the present invention is pivotally mounted on the rear end of a vehicle having an operator's compartment. One of the advantages of the present apparatus is that it may be moved quickly from place to place with ease and it is controllable by only one operator. The breaking apparatus is connected to the vehicle for pivotal movement about a transverse horizontal axis. A hydraulic cylinder is connected to the apparatus for raising and lowering it as desired. Further, the apparatus is connected to the vehicle for movement about a vertical axis whereby the operator may selectively move the apparatus to various lateral locations behind the vehicle.

The pavement breaking apparatus includes at least one spring pack connected between a leaf spring housing and an impact tool holder. The housing is connected to the vehicle for pivotal movement about a transverse horizontal axis and the hydraulic cylinder is connected to the housing for lifting and lowering the spring pack and tool holder. The apparatus is raised by the hydraulic cylinder to a vertical position for striking a sudden and heavy blow against the concrete pavement. The impact force from the tool against the concrete pavement may be varied by moving the tool to various vertical positions. Thus, the pavement breaking apparatus may be maneuvered to selectively strike only certain areas. This is particularly useful in avoiding or minimizing damage to joint areas in the existing concrete pavement. Further, the frequency of blows to the pavement may be adjusted as well as the amount of impact by controlling the actuation of the hydraulic cylinder.

In a preferred form, the pavement breaking apparatus includes a pair of parallel, side-by-side, spring packs, each having a plurality of stacked leaf springs. The spring packs are identical and include a main centrally located leaf spring which extends full length between the housing and tool holder. A first group of leaf springs having variable lengths are stacked together on one side of the main spring and a second group of leaf springs also having variable lengths are stacked together on the other side of the main spring. The first group of leaf springs are mirror images of the second group of leaf springs. The longest leaf spring of each group is positioned toward the center of the spring pack with the other springs of each group becoming progressively shorter.

Each spring pack further includes third and fourth groups of equal length leaf springs which are positioned on either side of the main spring. The springs of the third and fourth groups are positioned in the spring pack between the main spring and the springs of the first and second groups. Finally, fifth and sixth groups of springs are positioned in each pack on opposite sides of the main spring between the main spring and the first and second groups of springs. The number of springs in each of the third and fourth groups is the same as the number of springs in each of the fifth and sixth groups. However, the ends of the springs in the third and fourth groups are separated from the ends of the springs in the fifth and sixth groups to form open areas within the spring pack.

The leaf spring housing includes spaced vertical walls with the ends of each spring pack being located between the walls for alignment and attachment purposes. Further, the housing includes upper and lower support plates with the upper support plate having adjustable tensioning bolts. The ends of the spring packs are secured within the housing by tightening bolts, thereby squeezing the ends against the lower support plate.

Each of the leaf springs including the main leaf spring have dimples or projections which are nestable with one another for providing a locking feature between the individual leaf springs. Further, the leaf spring packs are held in alignment along their lengths by bracket assemblies which include opposed spacer plates and buffer pads. The bracket assemblies permit some relative sliding between the leaf springs when the apparatus is moved vertically or flexes during impact.

The present construction permits flexing of the various leaf spring groups in an improved manner. The bracket assemblies permit the leaf springs to slide relative to one another during vertical movement or impact. Further, the gaps or open areas within each spring pack permit additional sliding movement for flexibility. Thus, the flexibility of the spring packs is improved which assist in fracturing the concrete without distorting the surface.

Another feature of the present construction resides in the hydraulic cylinder which controls the frequency of blows to the concrete. The cylinder includes a bore with a piston moveable therein. The piston has a plurality of peripherally mounted steel piston rings thereon which increase the efficiency and durability for the hydraulic cylinder during high frequency usage.

Other advantages and meritorious features of the pavement breaking apparatus of the present invention will be more fully understood from the following description of the invention, the appended claims, and the drawings, a brief description of which follows.

BRIEF DESCRIPTION OF DRAWINGS

FIG. 1 is a perspective view of the pavement breaking apparatus of the present invention mounted on a vehicle.

FIG. 2 is a side elevational view of the pavement breaking apparatus.

FIG. 11 is a side elevational view illustrating the leaf spring arrangement for the pavement breaking apparatus.

FIG. 12 is a top plan view of the leaf spring packs for the pavement breaking apparatus.

DETAILED DESCRIPTION OF THE INVENTION

Figure 3:
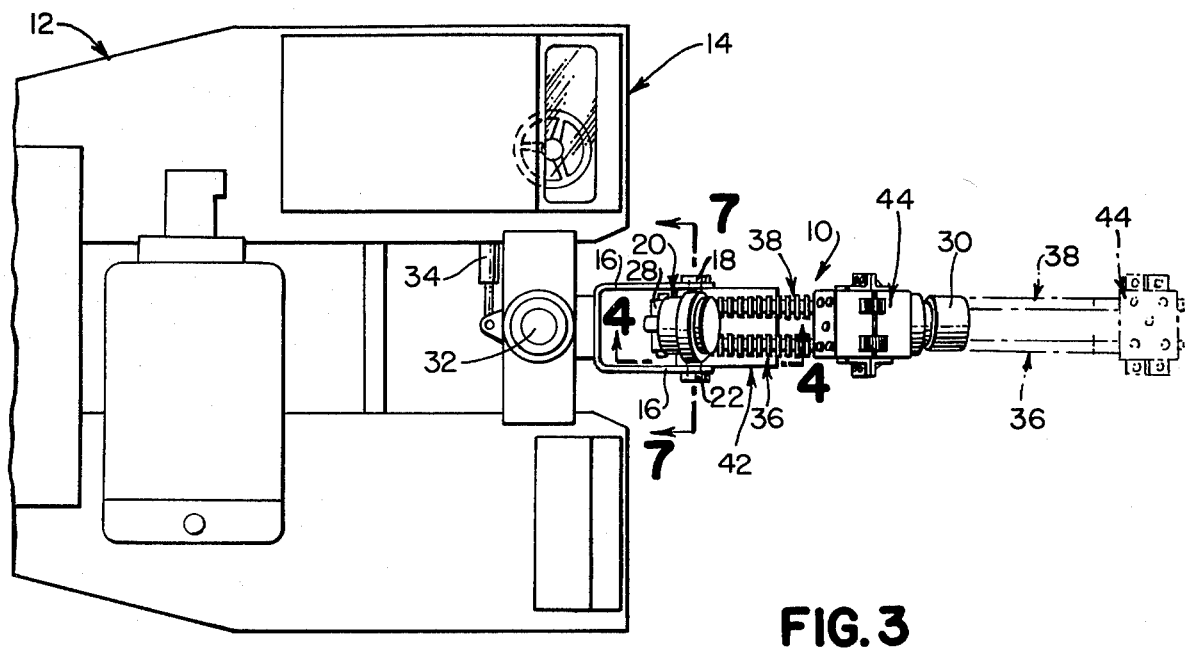
FIG. 3 is a top plan view of the pavement breaking apparatus of the present invention.

While this invention is susceptible of embodiment in different forms, there is shown in the drawings and will herein be described in detail, one specific embodiment, with the understanding that the present disclosure is to be considered as an exemplification of the principles of the invention and is not intended to limit the invention to the embodiment illustrated.

Referring to FIGS. 1-4, the pavement breaking apparatus 10 is pivotally mounted on the rear end of a vehicle 12 having an operator's compartment 14. One of the advantages of the present apparatus is that it may be moved quickly from place to place with ease and it is controllable by only one operator. The pavement breaking apparatus 10 is connected to mounting brackets 16 on the rear end of vehicle 12 by pivot 18 thereby permitting rotatable movement of apparatus 10 about a transverse horizontal axis. A hydraulic cylinder 20 is connected between mounting brackets 16 by trunnion assembly 22. The rod end of hydraulic cylinder 20 is attached by pin 26 to a weldment 28 on the pavement breaking apparatus 10. Thus, extension of hydraulic cylinder 20 causes the breaking apparatus 10 to rotate about pivot 18 for moving impact tool 30 vertically.

Referring to FIG. 3, the pavement breaking apparatus 10 is also connected to vehicle 12 for pivotal movement about a vertical axis 32 by extension and retraction of hydraulic cylinder 34. The operator, therefore, may selectively move the pavement breaking apparatus 10 to various lateral locations behind vehicle 12 by extending or retracting cylinder 34. Apparatus 10 is raised by cylinder 20 to a position such as the full line position shown in FIG. 2 for striking a sudden and heavy blow against the concrete pavement. The impact forces from tool 30 against the concrete pavement may be varied by moving tool 30 to various vertical positions.

Thus, pavement breaking apparatus 10 may be maneuvered to selectively strike only certain areas. This is particularly important in minimizing damage to joint areas in the concrete pavement. The frequency of blows to the pavement may be adjusted as well as the amount of impact by controlling the actuation of cylinder 20.

Referring now to FIGS. 4-12, pavement breaking apparatus 10 includes a pair of parallel spring packs 36 and 38, each having a plurality of stacked leaf springs. Spring packs 36 and 38 are identical and include a main centrally located leaf spring 40 which extends full length between leaf spring housing 42 and tool holder 44. A first group of leaf springs 46 having variable lengths are stacked together on one side of main spring 40 and a second group of leaf springs 48 also having variable lengths are stacked together on the other side of main spring 40. The first group of leaf springs 46 are mirror images of the second group of leaf springs 48. The longest leaf spring of each group is positioned toward the center of the spring pack closest to main spring 40 with the other springs of each group becoming progressively shorter.

As illustrated in FIG. 11, each spring pack 36 and 38 further includes third and fourth groups of equal length leaf springs 50 and 52 which are positioned on either side of main spring 40. The springs of group 50 are positioned in the spring stack between main spring 40 and the variable length springs of group 46. Similarly, the springs of group 52 are positioned in the spring stack between main spring 40 and the variable length springs of group 48.

Finally, fifth and sixth groups of springs 54 and 56 are positioned in each stack on opposite sides of main spring 40 and between the leaf springs of groups 46 and 48. The number of springs in each group 50 and 52 is the same as the number of springs in each group 54 and 56. Spring groups 50 and 52, however, are separated from spring groups 54 and 56 in each spring stack as illustrated by the open areas 58 in FIG. 11.

Leaf spring housing includes spaced vertical walls 60, 62, 64 and 66 with the ends of spring pack 36 being located between walls 60 and 62 and the ends of spring pack 38 being located between walls 64 and 66. Housing 42 further includes a lower support plate 68 and an upper support plate 70 having adjustable tensioning bolts 72. The ends of spring packs 36 and 38 are secured within housing 42 by tightening bolts 72 thereby squeezing the ends against support plate 68.

Figure 4:
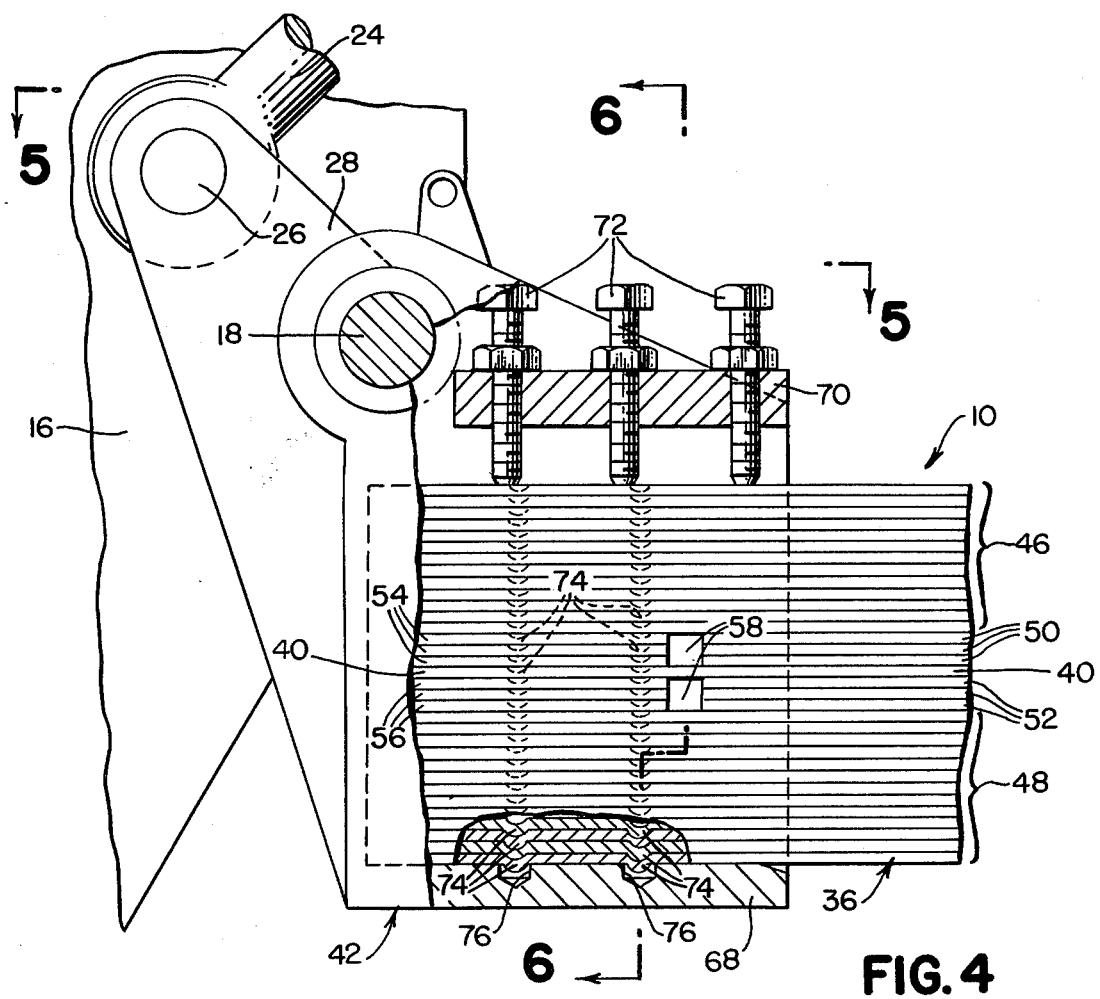
FIG. 4 is an enlarged cross-sectional view taken along line 4—4 in FIG. 3.
Figure 5:
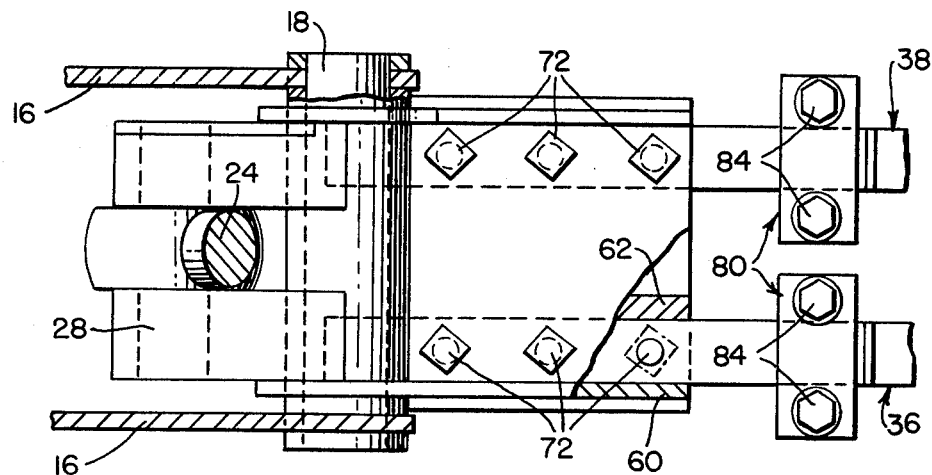
FIG. 5 is a view taken along line 5—5 in FIG. 4.
Figure 6:
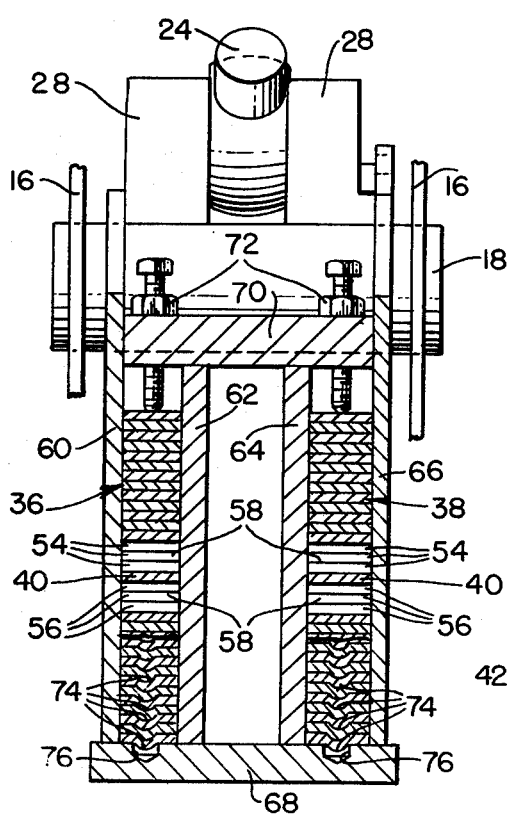
FIG. 6 is a cross-sectional view taken along line 6—6 in FIG. 4.

Each of the leaf springs of groups 46, 48, 54, and 56 and the main leaf spring 40 have dimples or projections 74 which nest with one another as shown in FIGS. 4 and 6 for providing a locking feature between the individual leaf springs. Support plate 68 includes recesses 76 for receiving the dimples or projections 74 of the bottom leaf spring of each pack.

Figure 8:
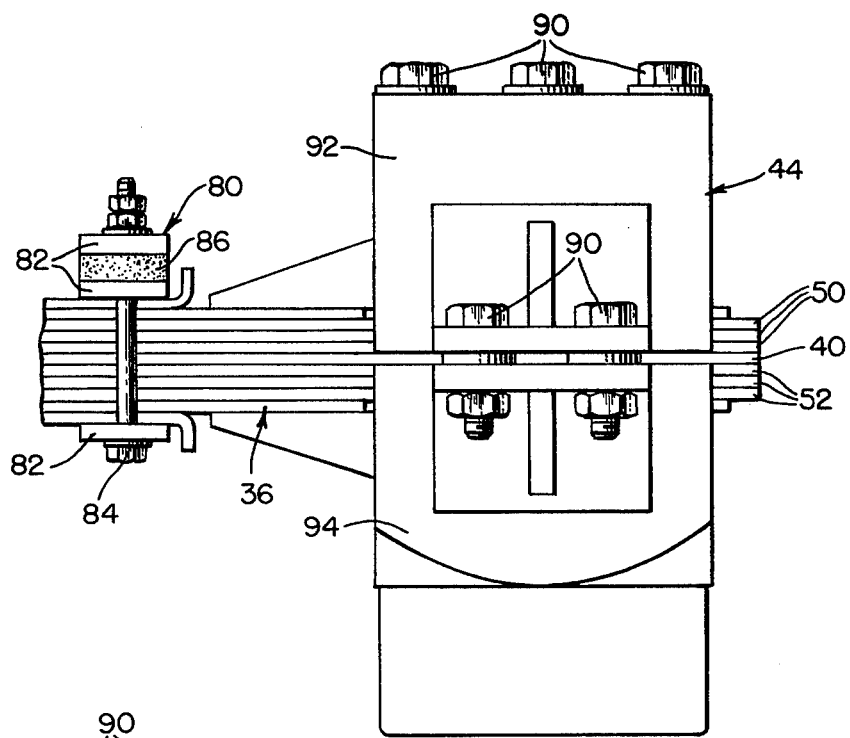
FIG. 8 is a side elevational view of the tool holder connection for the pavement breaking apparatus.
Figure 9:
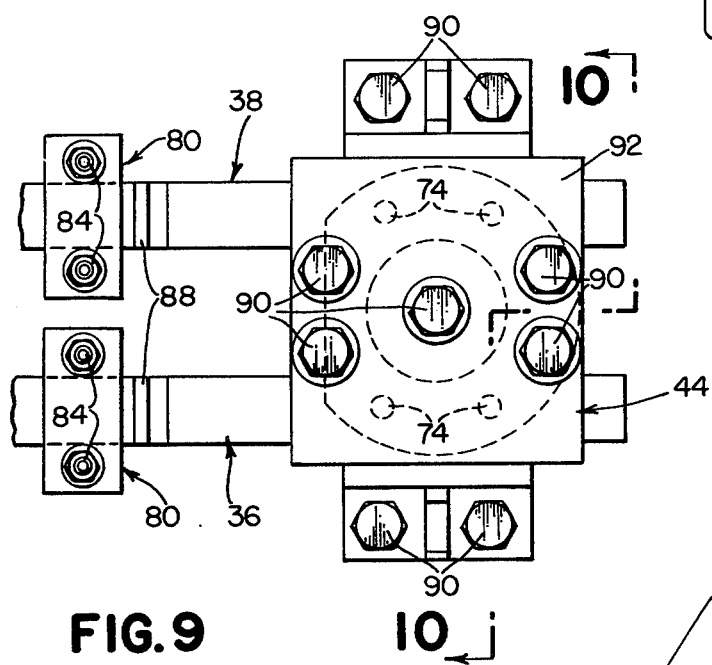
FIG. 9 is a top plan view of the tool holder.
Figure 10:
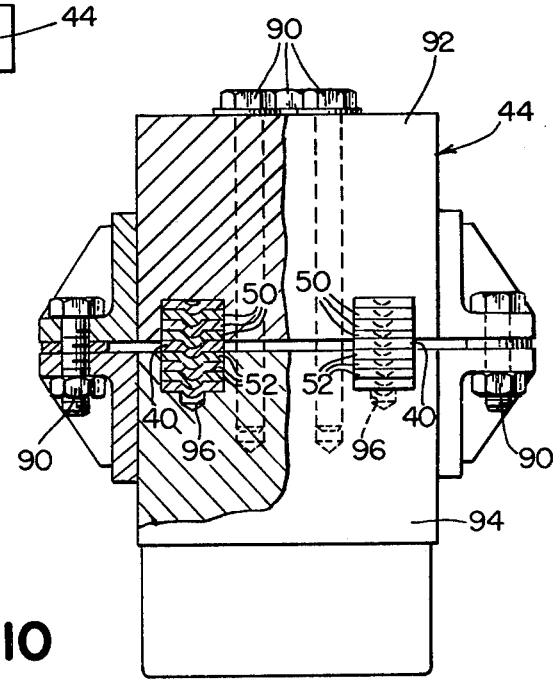
FIG. 10 is a view, partly in cross-section, taken along line 10—10 in FIG. 9.

The leaf spring packs 36 and 38 are held in alignment along their lengths by bracket assemblies 80 which include opposed spacer plates 82, fasteners 84, and buffer pads 86 (FIG. 8). The bracket assemblies 80 permit some relative sliding between the leaf springs when the apparatus 10 is moved vertically or flexes during impact. Upturned ends 88 on the leaf springs prevent the bracket assemblies 80 from moving out of position.

At the tool holder end 44 of apparatus 10, the leaf springs of groups 50 and 52 include dimples or projections 74 which are nestable with one another to lock the individual leaf springs in a stack. The leaf springs are locked within tool holder 44 by tightening the fasteners 90 for drawing tool holder body halves 92 and 94 together. The lower tool holder body half 94 includes recesses 96 for receiving the dimples 72 of the bottom leaf spring in each stack.

Again referring to FIG. 11, the present construction permits flexing of various leaf spring groups in an improved manner. Bracket assemblies 80 permit the leaf springs of groups 46 and 48 to slide relative to one another during vertical movement or impact. Further, the leaf springs of groups 50 and 52 are permitted slidable movement because of the gaps 58 in the spring packs 36 and 38. Thus, the flexibility of the spring packs 36 and 38 is improved which assists in fracturing the concrete without distorting the surface.

Figure 7:
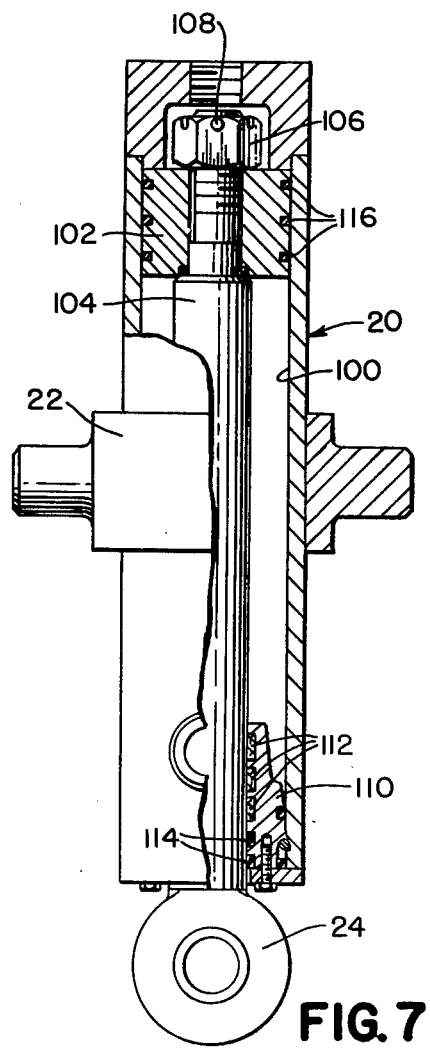
FIG. 7 is a side elevational view, partly in cross-section, of the hydraulic cylinder for actuating the pavement breaking apparatus.

Another feature of the present invention resides in the hydraulic cylinder 20 which controls the frequency of blows to the concrete. As illustrated in FIG. 7, hydraulic cylinder 20 includes a bore 100 with a piston 102 moveable therein. Piston 102 is secured to piston rod 104 by slotted nut 106 and roll pin 108. As described, trunnion mounting 22 is connected between mounting brackets 16 and piston rod end 24 is connected to weldment 28 on housing 42. The piston rod 104 is slidable through head 110 having wear rings 112 and seals 114. Piston 102 also includes a plurality of peripherally mounted steel piston rings 116 which increase the efficiency and durability for the hydraulic cylinder 20 during high frequency usage.

It will be apparent to those skilled in the art that the foregoing disclosure is exemplary in nature rather than limiting, the invention being limited only by the appended claims.

I claim:
1. An apparatus suitable for breaking pavement, said apparatus comprising:
    (a) at least one spring pack connected between a housing and an impact tool holder, said impact tool holder having an impact tool connected thereto, said housing connected to one end of a vehicle for pivotal movement about a transverse horizontal axis;
    (b) a hydraulic cylinder connected to said housing for rotating said housing and thereby lifting and lowering said spring pack and tool holder, and said housing connected to said vehicle for movement about a vertical axis thereby permitting lateral swinging movement of said spring pack and tool holder;
    (c) said spring pack including a plurality of stacked leaf springs with a centrally located main leaf spring extending full length between said housing and said tool holder, a first group of leaf springs having variable lengths being stacked together on one side of said main spring and a second group of leaf springs having variable lengths being stacked together on the other side of said main spring, said spring pack further including third and fourth groups of leaf springs positioned on opposite sides of said main spring between said main spring and said first and second groups of springs, and fifth and sixth groups of leaf springs mounted on opposite sides of said main spring between said main spring and said first and second groups of springs, and the ends of said third and fourth groups of springs being spaced from the ends of said fifth and sixth groups of springs to form open areas within said spring pack.

2. The apparatus as defined in claim 1 wherein the first group of leaf springs being mirror images of the second group of leaf springs, and the longest leaf spring of either said first or second group being positioned toward the center of said spring pack with the other springs of either said first or second group becoming progressively shorter.

3. The apparatus as defined in claim 1 wherein said third and fourth groups of leaf springs are of equal length, and the number of springs in each of said third and fourth groups being the same as the number of springs in each of said fifth and sixth groups of springs.

4. The apparatus as defined in claim 1 wherein said housing including spaced vertical walls with the end of said spring pack being located between said walls, and said housing further including a lower support plate and an upper support plate having adjustable tensioning means, and the end of said spring pack being squeezed between said upper and lower support plates in response to tightening of said tensioning means.

5. The apparatus as defined in claim 1 wherein each of the leaf springs of said groups and the main leaf spring having projections which are nestable with one another for providing locking between the individual leaf springs.

6. The apparatus as defined in claim 1 wherein said spring pack being held in alignment along its length by a plurality of bracket assemblies, each including opposed spacer plates and a buffer pad for permitting relative sliding movement between said leaf springs when said apparatus is moved vertically or flexed during impact.

7. The apparatus as defined in claim 1 wherein said hydraulic cylinder including a bore with a piston moveable therein, said piston including a plurality of peripherally mounted steel piston rings for increasing the efficiency and durability of the hydraulic cylinder during high frequency usage.

* * * * *